(12) United States Patent
Takagawa et al.

(10) Patent No.: US 10,766,513 B2
(45) Date of Patent: Sep. 8, 2020

(54) ARTICLE TRANSPORT VEHICLE

(71) Applicant: Daifuku Co., Ltd., Osaka-shi (JP)

(72) Inventors: Natsuo Takagawa, Hinocho (JP); Kazuharu Yoshinaga, Hinocho (JP); Toshikazu Kato, Hinocho (JP); Yusuke Morimoto, Hinocho (JP)

(73) Assignee: Daifuku Co., Ltd., Osaka-shi (JP)

(*) Notice: Subject to any disclaimer, the term of this patent is extended or adjusted under 35 U.S.C. 154(b) by 206 days.

(21) Appl. No.: 15/969,126

(22) Filed: May 2, 2018

(65) Prior Publication Data
US 2018/0327009 A1 Nov. 15, 2018

(30) Foreign Application Priority Data

May 9, 2017 (JP) .................................. 2017-093177

(51) Int. Cl.
*B61L 23/24* (2006.01)
*B65G 13/12* (2006.01)
*B65G 35/06* (2006.01)
*G05D 1/02* (2020.01)
*B61L 23/34* (2006.01)
(Continued)

(52) U.S. Cl.
CPC ............ *B61L 23/34* (2013.01); *B61L 23/041* (2013.01); *B61L 25/025* (2013.01); *B61L 27/04* (2013.01); *B65G 13/12* (2013.01); *B65G 35/06* (2013.01); *G05D 1/0214* (2013.01); *G05D 1/0238* (2013.01); *B65G 43/00* (2013.01); *B65G 47/642* (2013.01); *B65G 2203/0266* (2013.01);
(Continued)

(58) Field of Classification Search
CPC ........ B65G 13/12; B65G 35/06; B65G 43/00; B65G 2203/0266; B65G 2203/042; B65G 47/642; B61L 25/025; B61L 23/041; B61L 27/04; B61L 23/34; G05D 1/0238; G05D 1/0214; G05D 2201/0216
See application file for complete search history.

(56) References Cited

U.S. PATENT DOCUMENTS 5,492,066 A * 2/1996 Nozaki .................... B61C 13/04
104/119
5,664,503 A * 9/1997 Kawai ..................... B61B 13/04
105/141

(Continued)

FOREIGN PATENT DOCUMENTS

JP H0588746 A 4/1993
JP H10161745 A 6/1998

(Continued)

*Primary Examiner* — Mussa A Shaawat
(74) *Attorney, Agent, or Firm* — The Webb Law Firm

(57) ABSTRACT

An article transport vehicle includes an obstacle sensor having a detection area that includes at least the width of the own vehicle and that expands in the advancing direction, controls the travel of the own vehicle, based on as front inter-object distance corresponding to own-vehicle position information indicating a position of the own vehicle and front object position information indicating a position on a track of a front object that is located in front of the own vehicle and whose position on the track is specified, and sets a length of the detection area E along the advancing direction of the obstacle sensor to be variable according to the front inter-object distance such that the length is less than the front inter-object distance.

15 Claims, 8 Drawing Sheets

(51) Int. Cl.
  *B61L 27/04* (2006.01)
  *B61L 23/04* (2006.01)
  *B61L 25/02* (2006.01)
  B65G 43/00 (2006.01)
  B65G 47/64 (2006.01)
(52) U.S. Cl.
  CPC .................. *B65G 2203/042* (2013.01); *G05D 2201/0216* (2013.01)

(56) References Cited

U.S. PATENT DOCUMENTS

| | | | | |
|---|---|---|---|---|
| 6,290,188 B1* | 9/2001 | Bassett | ................... | B61L 23/34 246/1 C |
| 6,530,735 B1* | 3/2003 | Trammell | ................ | B25J 15/00 198/750.11 |
| 6,695,120 B1* | 2/2004 | Trammell | ................... | B25J 5/02 198/375 |
| 6,781,524 B1* | 8/2004 | Clark | .................... | B61L 25/025 180/168 |
| 6,889,813 B1* | 5/2005 | Trammell | ................ | B66F 9/07 198/346.3 |
| 9,758,308 B1* | 9/2017 | Nishikawa | ........ | H01L 21/67276 |
| 10,187,542 B1* | 1/2019 | Fielding | ................ | G06F 16/182 |
| 2005/0095087 A1* | 5/2005 | Sullivan | ............ | H01L 21/67736 414/217 |
| 2006/0104712 A1* | 5/2006 | Bufano | ............. | H01L 21/67715 404/1 |
| 2007/0294029 A1* | 12/2007 | D'Andrea | ............ | G01C 21/005 701/410 |
| 2008/0051985 A1* | 2/2008 | D'Andrea | ........ | G05B 19/41895 701/410 |
| 2011/0241845 A1* | 10/2011 | Sullivan | ............ | H01L 21/67294 340/10.42 |
| 2013/0213755 A1* | 8/2013 | Shibata | ..................... | B61B 3/02 191/22 R |
| 2014/0358338 A1* | 12/2014 | Harasaki | ............ | G05D 1/0289 701/19 |
| 2017/0183154 A1* | 6/2017 | Kinugawa | ............ | B65G 1/0457 |
| 2017/0186124 A1* | 6/2017 | Jones | ....................... | G10L 25/51 |
| 2017/0330135 A1* | 11/2017 | Taylor | .................. | G06K 7/1413 |
| 2018/0057261 A1* | 3/2018 | Takagawa | ............ | B65G 1/0492 |
| 2018/0114415 A1* | 4/2018 | Mattingly | ................ | G08B 7/02 |
| 2018/0118239 A1* | 5/2018 | Murakami | ............. | B65G 43/02 |
| 2018/0339456 A1* | 11/2018 | Czinger | ................ | B33Y 40/00 |
| 2019/0229003 A1* | 7/2019 | Kesil | .................... | B65G 1/0457 |
| 2019/0333012 A1* | 10/2019 | Jacobus | ................ | G06Q 10/087 |

FOREIGN PATENT DOCUMENTS

| | | |
|---|---|---|
| JP | 11202051 A | 7/1999 |
| JP | 2003107154 A | 4/2003 |
| JP | 2007213495 A | 8/2007 |
| JP | 2009265792 A | 11/2009 |
| JP | 201211947 A | 1/2012 |

* cited by examiner

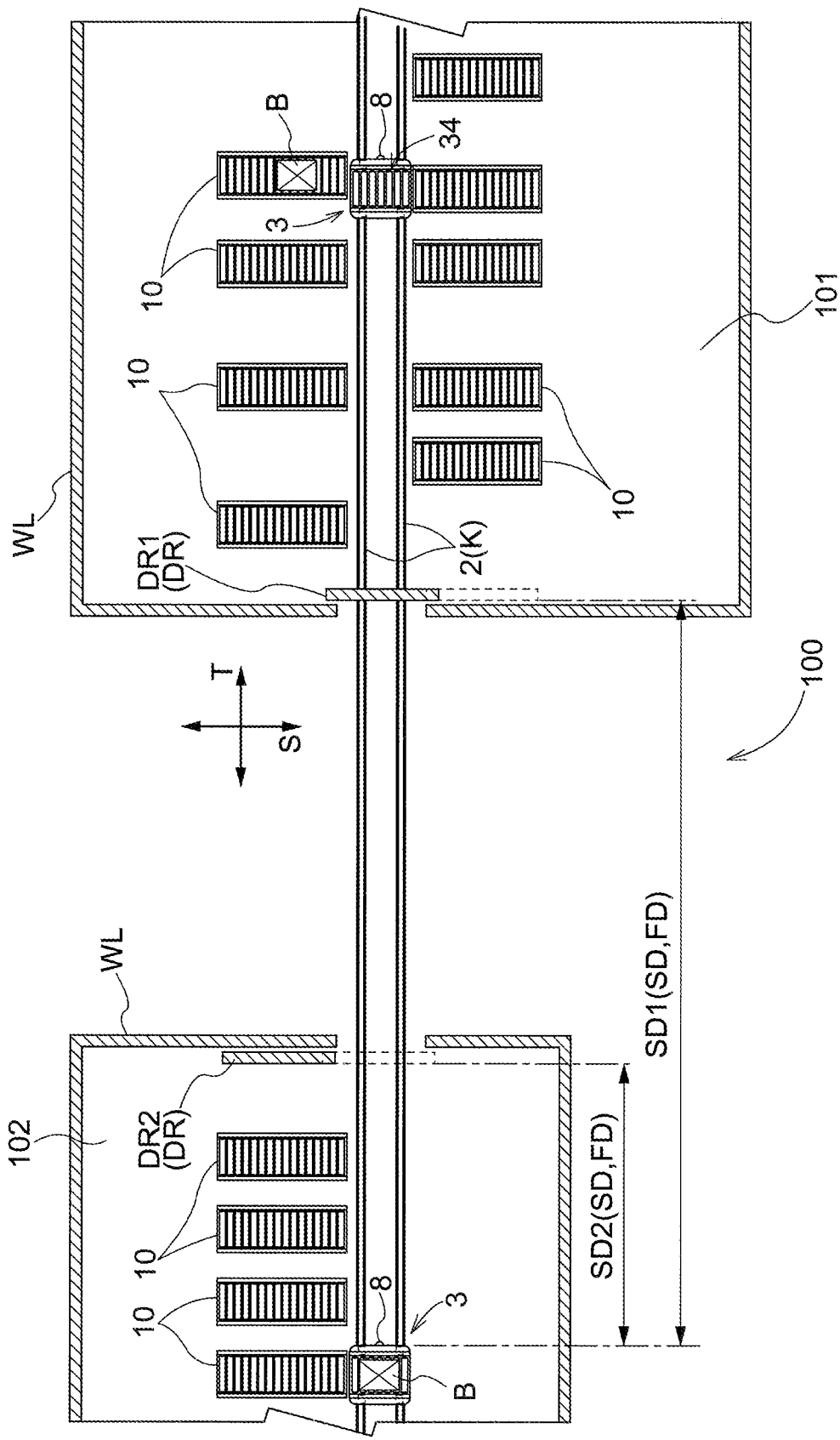

ARTICLE TRANSPORT VEHICLE

CROSS-REFERENCE TO RELATED APPLICATION

This application claims priority to Japanese Patent Application No. 2017-093177 filed May 9, 2017, the disclosure of which is hereby incorporated in its entirety by reference.

BACKGROUND OF THE INVENTION

1. Field of the Invention

The present invention relates to an article transport vehicle for use in an article transport facility in which a plurality of article transport vehicles traveled along a track so as to transport articles.

2. Description of the Related Art

Article transport vehicles that automatically transport articles are used in article transport facilities at production sites, article warehouses, and the like. In the article transport facility illustrated in JP 2007-213495A, a plurality of article transport vehicles travel along a track. In this article transport facility, a sensor for detecting the positions of the article transport vehicles on the track, a sensor for detecting the inter-vehicle distance between the article transport vehicles, and the like are used. The plurality of article transport vehicles are controlled such that the article transport vehicles will not collide with each other, based on their positions on the track and the inter-vehicle distance.

Meanwhile, for such an article transport facility, there is the possibility that an operator or an obstacle enters the movement region of the article transport vehicles, and comes into contact with the article transport vehicles. For this reason, each article transport vehicle may be further provided with an obstacle sensor. In this case, however, there is the possibility that a preceding article transport vehicle on the track is detected by the obstacle sensor mounted on the following article transport vehicle, thus limiting the travel of the following article transport vehicle. That is, such excessive detection by the obstacle sensor may reduce the operating efficiency of the facility even when the travel of the article transport vehicles is efficiently controlled according to the positions of the article transport vehicles and the inter-vehicle distance thereof.

SUMMARY OF THE INVENTION

In view of the foregoing circumstances, there is a need to provide a technique by which, in an article transport facility in which a plurality of article transport vehicles travel along a track so as to transport articles, it is possible to appropriately detect an obstacle that may possibly come into contact with the plurality of article transport vehicles, without hindering the smooth travel of the article transport vehicles.

According to an aspect, an article transport vehicle for use in an article transport facility in which a plurality of article transport vehicles travel along a track so as to transport articles, includes an obstacle sensor having a detection area that includes at least a width of own vehicle in a width direction extending along a horizontal plane and orthogonal to an advancing direction of the own vehicle and that expands in the advancing direction. The article transport vehicle controls travel of the own vehicle, based on a front inter-object distance corresponding to own-vehicle position information indicating a position on the track of the own vehicle and front object position information indicating a position on the track of a front object that is located in front of the own vehicle and whose position on the track is specified, and sets a length of the detection area along the advancing direction of the obstacle sensor to be variable according to the front inter-object distance such that the length is less than the front inter-object distance.

With this configuration, the obstacle sensor has a detection area that includes at least the width of the article transport vehicle and that expands in the advancing direction. Accordingly, it is possible to appropriately detect an obstacle that is present in the advancing direction of the article transport vehicle and that may possibly come into contact with the article transport vehicle when the article transport vehicle advances. Since the detection area is set to be less than the front inter-object distance, it is possible to reduce the possibility of erroneously detecting, as an obstacle, a front object whose position on the track is specified, such as a blocking device blocking the track in front of the own vehicle and another vehicle traveling in front of the own vehicle. In the case where the own vehicle is traveling, even when the position on the track of the front object is specified such as in the case of the blocking device, the front inter-object distance with the blocking device naturally varies. Since the state of travel (traveling or stopped) and the traveling speed of each of the vehicles, including the own vehicle and another vehicle are not always the same, the front inter-object distance with the other vehicle also varies. The detection area is set to be variable according to the front inter-object distance. Accordingly, even when the front inter-object distance varies, the detection area follows the variation so as to be less than the front inter-object distance. Therefore, it is possible to reduce the possibility of erroneously detecting, as an obstacle, a front object, including, for example, a blocking device blocking the track in front of the own vehicle and another vehicle traveling in front of the own vehicle. Thus, the present configuration makes it possible to appropriately detect an obstacle that may possibly come into contact with a plurality of article transport vehicles, without hindering the smooth travel of the article transport vehicles.

Further features and advantages will become apparent from the following description of embodiments of the article transport vehicle with reference to the drawings.

BRIEF DESCRIPTION OF THE DRAWINGS

FIG. 11 is a plan view showing an example of another configuration of the article transport facility.

DETAILED DESCRIPTION OF PREFERRED EMBODIMENTS

Figure 1:
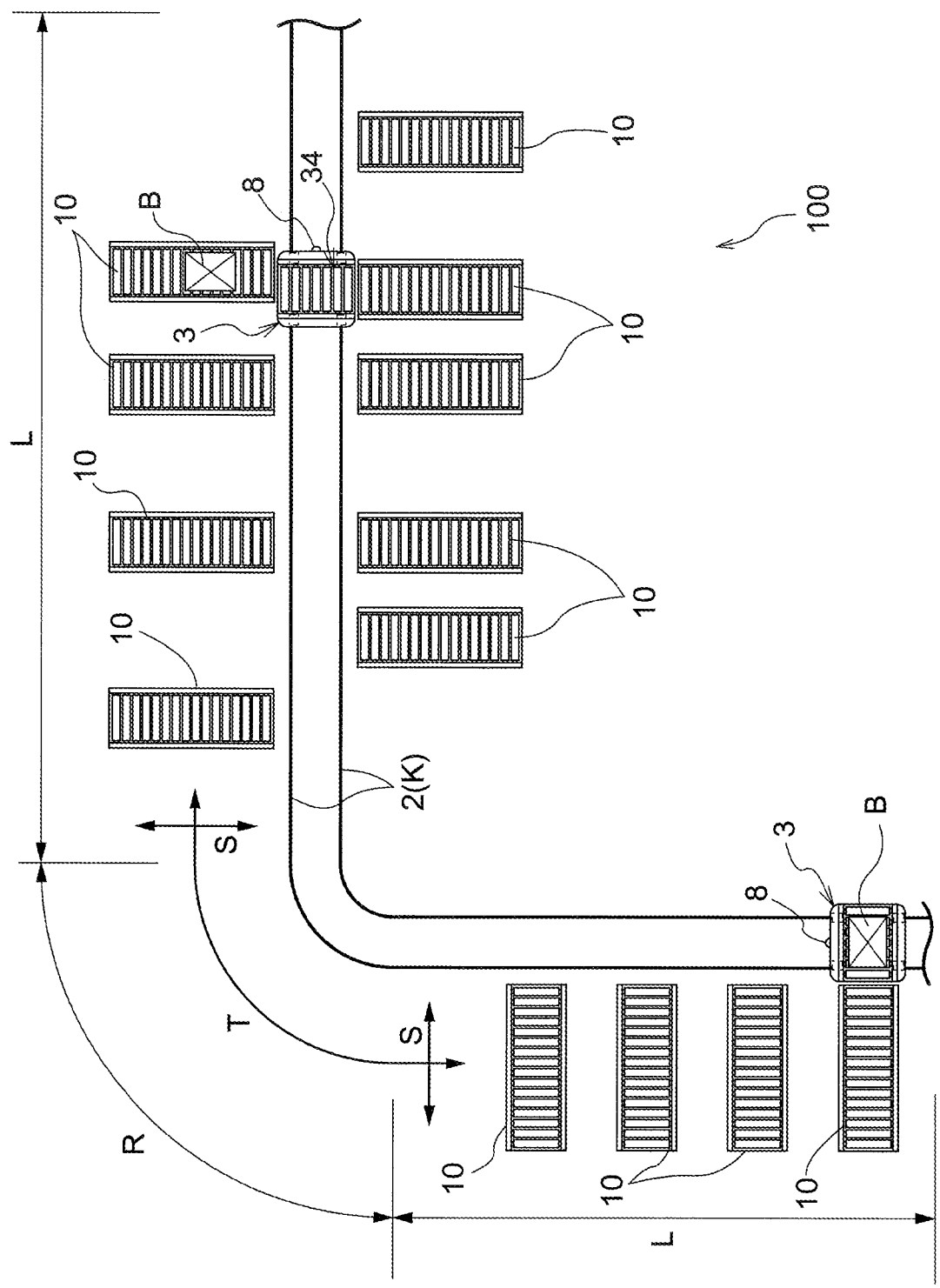
FIG. 1 is a plan view of an article transport facility.

Hereinafter, an embodiment of the article transport vehicle will be described with reference to the drawings. FIG. 1 shows an example of an article transport facility 100 in which a plurality of article transport vehicles 3 travel along a track K so as to transport articles B. Each article transport vehicle 3 travels on the track K installed via a plurality of stations 10 (article transfer locations) so as to transport the articles B between the stations 10. In the present embodiment, the track K has linear sections L and curved sections R. In the present embodiment, the track K is formed by a pair of traveling rails 2 serving as a traveling path that are disposed on the floor surface. The stations 10 are provided on opposite sides of the traveling rail pair in a width direction S in each linear section L so as to be spaced apart along an extension direction T of the traveling rails 2 (width direction S: direction orthogonal to the extension direction T along a horizontal plane). Note that the track K may also be a magnetic tape or the like that is attached to or embedded in the floor, for example. Alternatively, rails may be laid on the ceiling, and the article transport vehicle 3 may be a ceiling guided vehicle.

Figure 2:
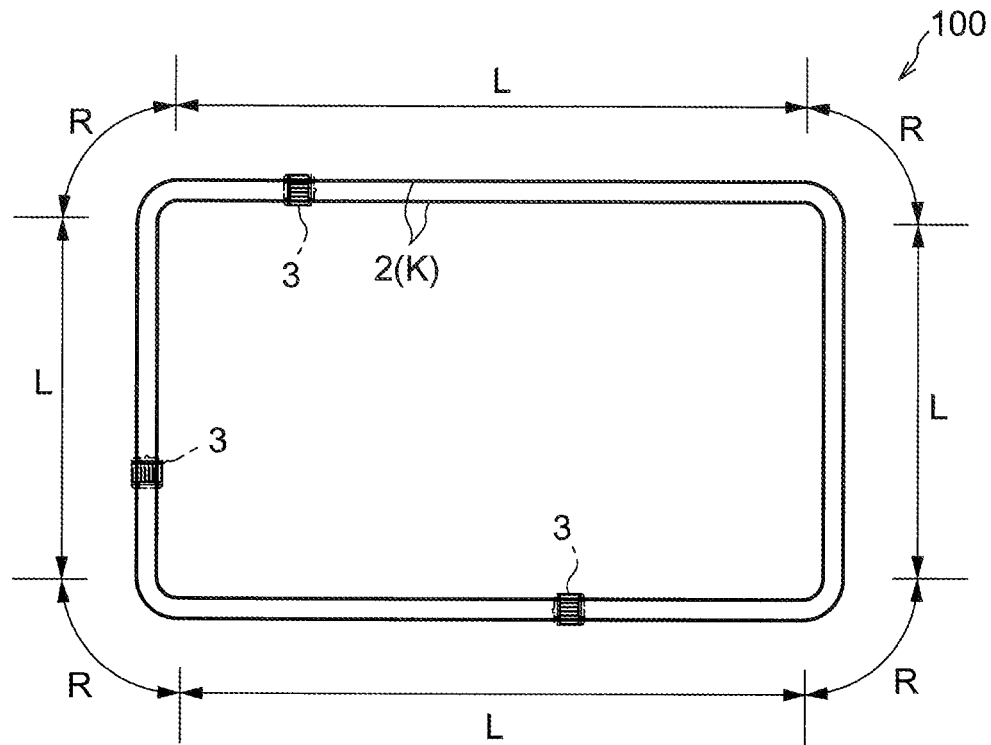
FIG. 2 is a schematic plan view showing an example of an endless track.
Figure 3:
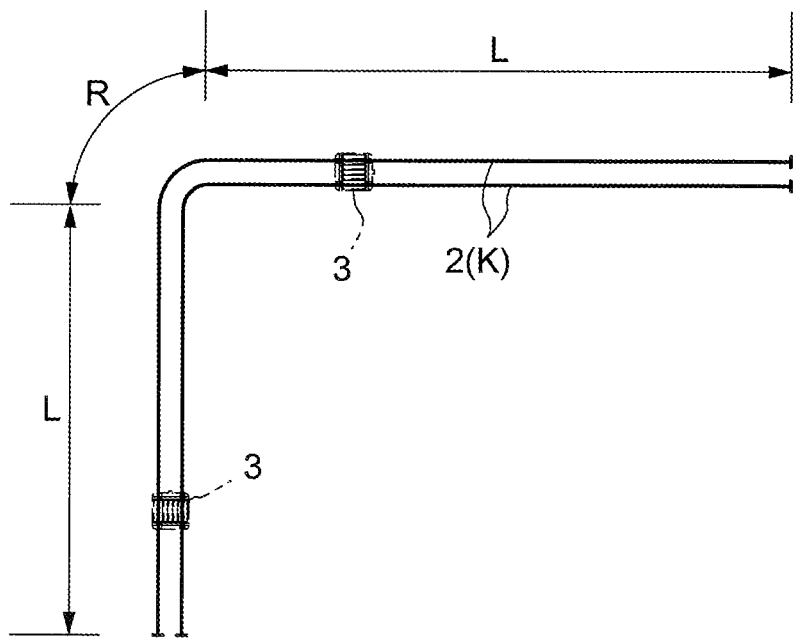
FIG. 3 is a schematic plan view showing an example of an ended track.

The track K may be an endless track that is formed in an annular shape with no end as shown in FIG. 2, or may be an ended track with defined opposite ends as shown in FIG. 3. When the track K is an ended track, the article transport vehicle 3 reciprocally travels along the track K so as to transport the articles B between the plurality of stations 10. When the track K is an endless track, the article transport vehicle 3 may travel only in one direction, or may reciprocally travel.

The stations 10 include a plurality of stations, including, for example, a retrieval station provided with a retrieval conveyor that transports the article B retrieved from an article storage rack (not shown), a storage station provided with a storage conveyor that transports the article B that is to be stored in the article storage rack, an incoming station provided with an incoming conveyor that transports the article B transported from the outside, and an outgoing station provided with an outgoing conveyor that transports the article B to the outside. For example, one of the plurality of stations 10 serves as a transport source, and another one of the stations 10 serves as a transport destination. When the article transport vehicle 3 moves toward a transport source, the transport source is a target traveling position of the article transport vehicle 3. When the article transport vehicle 3 moves toward a transport destination, the transport destination is a target traveling position of the article transport vehicle 3.

Figure 4:
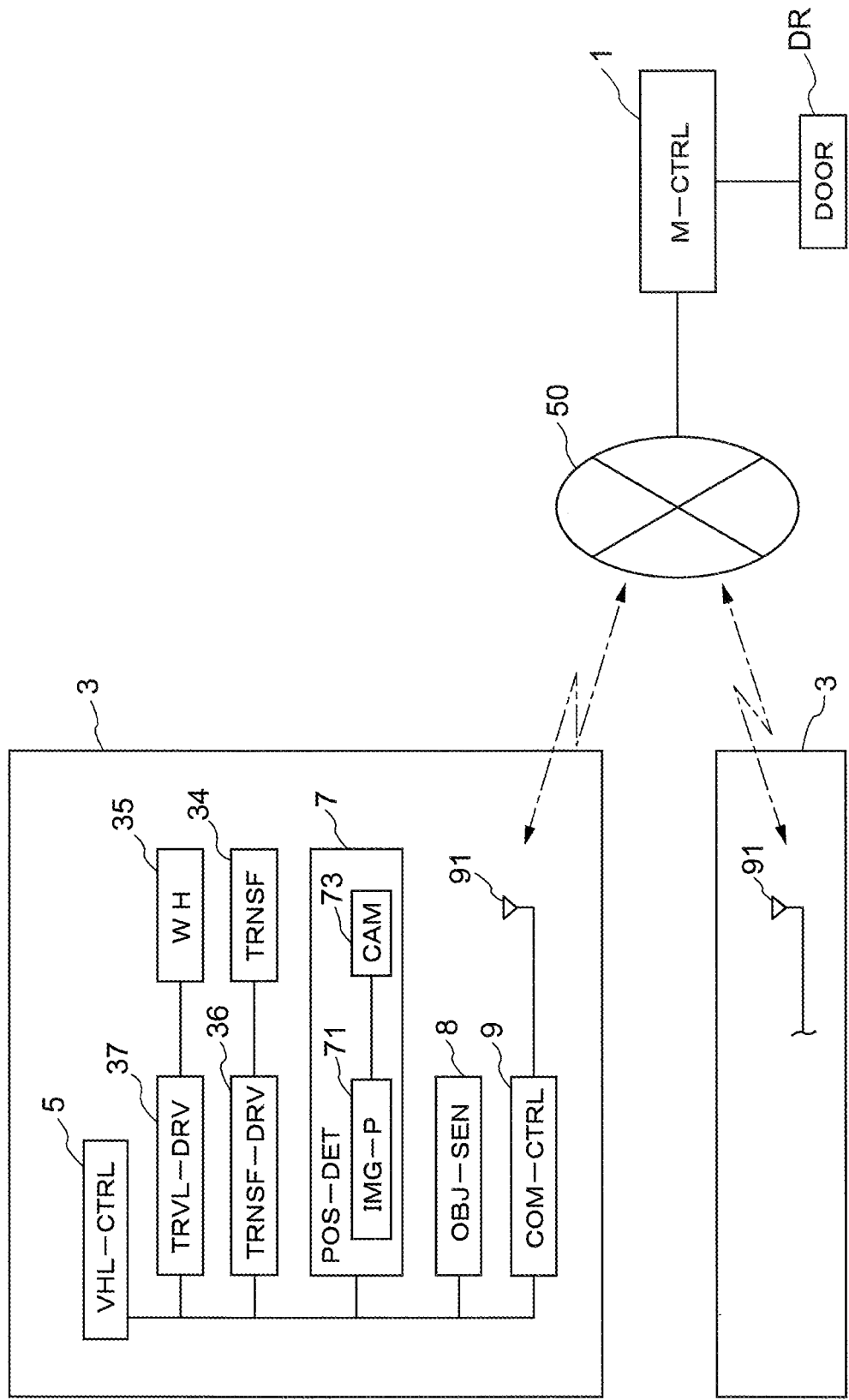
FIG. 4 is a block diagram schematically showing a configuration of the article transport facility.

As shown in FIG. 4, the article transport vehicle 3 includes a transfer device (TRNSF) 34 such as a roller conveyor that transfers the article B between the own vehicle and the stations 10, and a plurality of wheels (WH) 35 that travel on the traveling rails 2. The transfer device 34 is driven by a transferring driving portion (TRNSF-DRV) 36. The transferring driving portion 36 includes, for example, an actuator such as a motor that drives a roller conveyor, and a driving circuit including an inverter circuit that drives the actuator. The wheels 35 include a driving wheel and a following wheel, and the driving wheel is driven by a traveling driving portion (TRVL-DRV) 37. The traveling driving portion 37 includes, for example, a traveling motor that supplies rotational force to the wheel 35, and a driving circuit including an inverter circuit that drives the traveling motor.

The article transport vehicle 3 further includes a transport vehicle control portion (VHL-CTRL) 5, a position detection device (POS-DET) 7, an obstacle sensor (OBJ-SEN) 8, a communication control portion (COM-CTRL) 9, and a communication antenna 91. In accordance with an instruction from a management apparatus (M-CTRL) 1 described below, the transport vehicle control portion 5 causes the article transport vehicle 3 to travel at least from the transport source of the transport destination of the article B so as to transfer the article B at the transport source and the transport destination. That is, the transport vehicle control portion 5 drives the wheels 35 via the traveling driving portion 37, and also drives the transfer device 34 via the transferring driving portion 36. The position detection device 7 detects the position of each of the article transport vehicles 3 on the track K. As will be described below with reference to FIGS. 5 and 6, the position detection device 7 detects an absolute position P of the track K, and detects an absolute coordinate Q of the article transport vehicle 3 on the track K.

The communication control portion 9 and the communication antenna 91 provide position information (position information of the article transport vehicle 3, own-vehicle position information) including the information of the above-described absolute coordinate Q to another article transport vehicle 3 (another vehicle) and a management apparatus 1 via a network 50. The communication control portion 9 and the communication antenna 91 are capable of wireless communication (e.g., wireless LAN), and the network 50 is a wireless network. Note that the network 50 may have a configuration in which a plurality of different networks are connected to each other. For example, the network 50 may be configured by a wireless network and a wired network connected that are to each other. In addition, the article transport vehicles 3 are capable of directly communicating with each other via the network 50, and each article transport vehicle 3 acquires position information (another-vehicle position information) indicating the position (another-vehicle absolute coordinate Qp) of another vehicle by communicating with the other vehicle. As will be described below with reference to FIG. 7, based on the another-vehicle position information of another vehicle preceding the own vehicle, and the own-vehicle position information indicating the position of the own vehicle (own-vehicle absolute coordinate Qf), each article transport vehicle 3 can calculate the inter-vehicle distance (front inter-vehicle distance VD) between the other vehicle and the own vehicle. Note that the other vehicle is an example of a front object described below with reference to FIG. 11, and the another-vehicle position information is an example of a front object position information described below, and the front inter-vehicle distance VD is an example of a front inter-object distance FD described below.

Here, a communication configuration in a so-called infrastructure mode in which the article transport vehicles 3 directly acquire each other's position information via the network 50 is illustrated. However, it is also possible to adopt a communication configuration in a so-called ad hoc mode in which the article transport vehicles 3 directly communicate with each other without using the network 50. Note that the another-vehicle position information is not limited to a configuration in which it is directly acquired from another vehicle, and the another-vehicle position information may be indirectly acquired via another apparatus connected to the network 50. Another apparatus may be, for example, the management apparatus 1 or a location controller (position management apparatus), which is not shown. The management apparatus 1 or the location controller may calculate the front inter-vehicle distance VD of each of the article transport vehicles 3, and provide the front inter-vehicle distance VD to the article transport vehicle 3. However, when information is provided via the other apparatuses, there will be time differences in acquisition of the another-vehicle absolute coordinate Qp and the front inter-vehicle distance VD, resulting in a reduced degree of freshness of the information. Accordingly, it is preferable that, in each of the infrastructure mode and the ad hoc mode, the another-vehicle position information including the another-vehicle absolute coordinate Qp is directly provided from another vehicle, and the front inter-vehicle distance VD is calculated in the own vehicle.

As shown in FIG. 4, the article transport facility 100 includes a management apparatus 1 that controls the operation of each of the article transport vehicles 3, based on the position information detected by the position detection device 7. The management apparatus 1 acquires the position information of the plurality of article transport vehicles 3 via the network 50, and manages the operation of each of the article transport vehicles 3, based on the position at which each of the article transport vehicles 3 is present.

Based on the position information of each of the article transport vehicles 3, the management apparatus 1 designates, for example, the article transport vehicle 3 that is located close to the transport source, and gives the article transport vehicle 3 a transport instruction to transport the article B. The article transport vehicle 3 that has received the transport instruction performs the transfer and the transport of the article B under autonomous control mainly achieved by the transport vehicle control portion 5. That is, based on the transport instruction, the transport vehicle control portion 5 controls the traveling driving portion 37 and the transferring driving portion 36 so as to cause the article transport vehicle 3 to perform transfer and transport of the article B. Note that to enable the autonomous control, the article transport vehicle 3 may be further provided with, for example, various types of sensors such as a load presence sensor (not shown) for detecting the presence of the article B on the transfer device 34.

Figure 5:
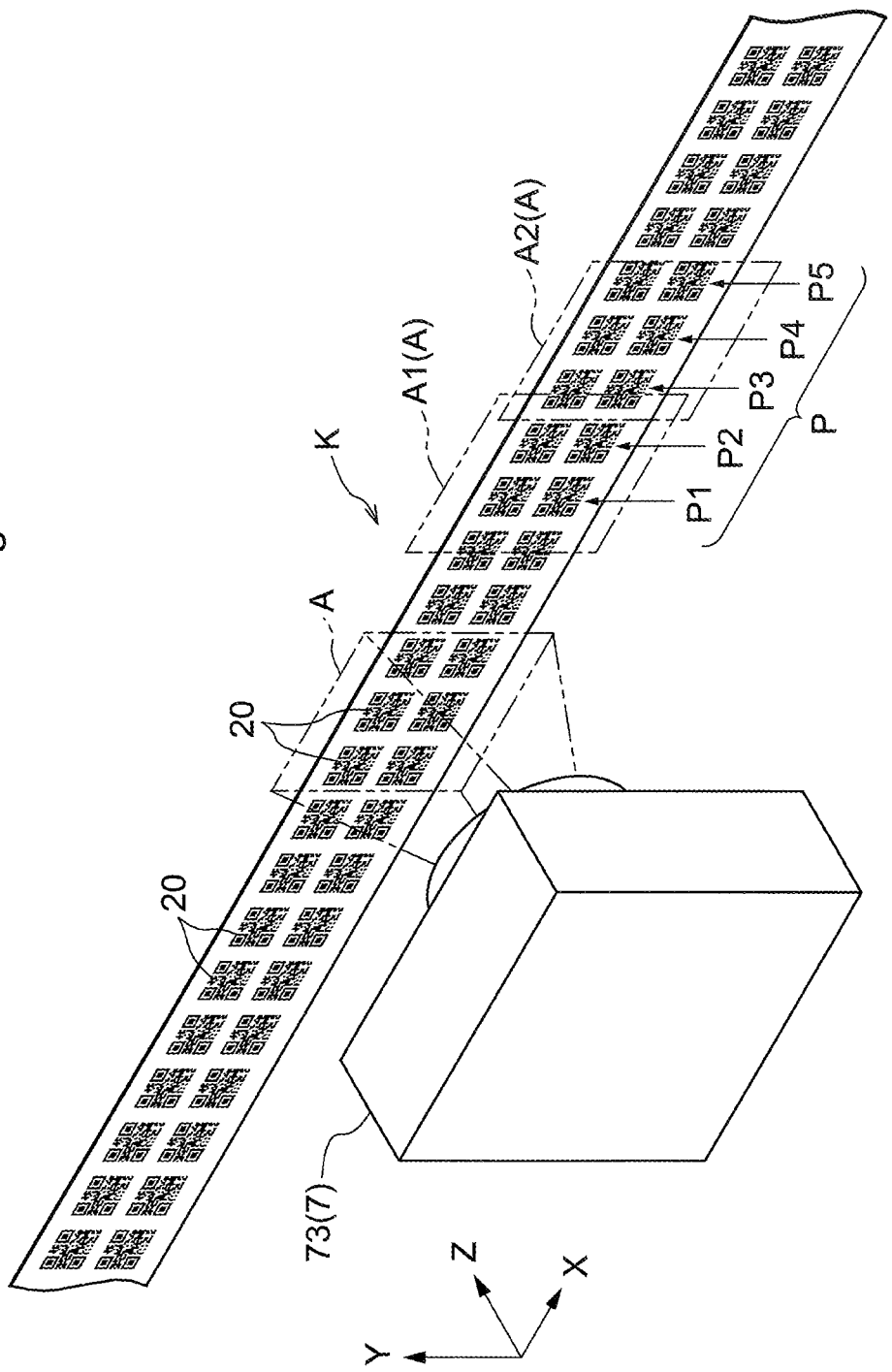
FIG. 5 is an explanatory diagram schematically showing a position detection principle of an article transport vehicle.

A plurality of article transport vehicles 3 are disposed on the track K, and it is necessary for the transport vehicle control portion 5 to know the positions of the own vehicle and the other vehicles in order to appropriately perform autonomous travel. As described above, each of the article transport vehicles 3 includes the position detection device 7, and the position detection device 7 detects the absolute coordinate Q of each of the article transport vehicles 3 on the track K, based on an index 20 provided along the track K. As shown in FIG. 5, the indices 20 indicating absolute positions on the track K are provided at a plurality of locations on the track K. FIG. 5 illustrates a configuration in which a plurality of indices 20 using a two-dimensional bar code are disposed side by side along the track K. Of course, the configuration of the index 20 is not limited thereto, and the index 20 may be a one-dimensional bar code, a plate with characters and numbers described thereon, or the like.

Here, the absolute position P is information specifying a position on the track K. The absolute position P has a resolution corresponding to the provision density of the indices 20 provided at a plurality of locations. Here, the provision density is a density corresponding to the interval at which the indices 20 are provided at least along the extension direction T of the track K. The absolute coordinate Q is information of the position (the coordinate on the track K) of the article transport vehicle 3 present on the track K. Although the absolute coordinate Q is prescribed based on the above-described absolute position P, theoretically, no limit is set for the resolution. However, practically, the performance (e.g., the resolution for detecting the index 20) of the position detection device 7 has a limit. Accordingly, the resolution of the absolute coordinate Q is determined according to the performance of the position detection device 7. Here, the performance of the position detection device in the present embodiment refers to, for example, the resolution of a camera 73 described below, or the resolution of an image captured by the camera 73. The absolute coordinate Q is information having a resolution that is higher than at least the resolution of the absolute position P.

As shown in FIG. 4, the position detection device 7 includes a camera (CAM) 73 that captures an image of the index 20 and an image processing portion (IMG-P) 71. The image processing portion 71 recognizes the information of the absolute position P indicated in the index 20 based on an image captured by the camera 73, and detects the absolute coordinate Q of the article transport vehicle 3. As shown in FIG. 5, the size and the placement position of each of the indices 20 are set such that six indices 20 can be fitted in a captured image (image capturing region A) of the camera 73, for example. The image processing portion 71 performs image processing on the two-dimensional bar code included in the captured image of the camera 73, thereby recognizing the information of the absolute positions indicated in the indices 20 of the two-dimensional bar codes. The same also applies to cases where the index 20 uses a one-dimensional bar code, or characters and numbers. For example, in the case where the index 20 uses characters and numbers, the information of the absolute position may be recognized by performing character recognition (OCR: Optical Character Recognition).

The position detection device 7 can calculate the relationship between the position of the camera 73 and the absolute position indicated in the index 20 from the relationship between the position of the camera 73 in a so-called world coordinate system (actual three-dimensional coordinate system) and the camera coordinate system projected onto a captured image of the camera 73. That is, the position detection device 7 can calculate the absolute coordinate of the camera 73 (here, an origin of the camera coordinate system) from the relationship with the absolute position by assigning the absolute position indicated in the index 20 to the coordinates of the camera coordinate system in the captured image. As shown in FIG. 5, the absolute coordinate can be determined as a coordinate of the three-dimensional Cartesian coordinate system having an X axis, a Y axis, and a Z axis.

However, the indices 20 are disposed at positions prescribed relative to the traveling rails 2, and the article transport vehicle 3 on which the camera 73 is mounted also travels on the traveling rails 2. Accordingly, the Y axis and the Z axis are practically substantially fixed, and the index 20 here may be considered as a one-dimensional coordinate. Of course, the coordinates of the Y axis and the Z axis may also vary depending on the individual differences, distortion, and aging of the traveling rails 2 and the wheels 35, the displacement of the article transport vehicle 3 in the up-down direction occurring depending on whether or not the article B is mounted on the article transport vehicle 3, the error in the position of attachment of the index 20 to the traveling rails 2, and the like. In such cases, it is, of course, preferable that the coordinates of the Y axis and the Z axis are corrected based on a result of image recognition.

Figure 6:
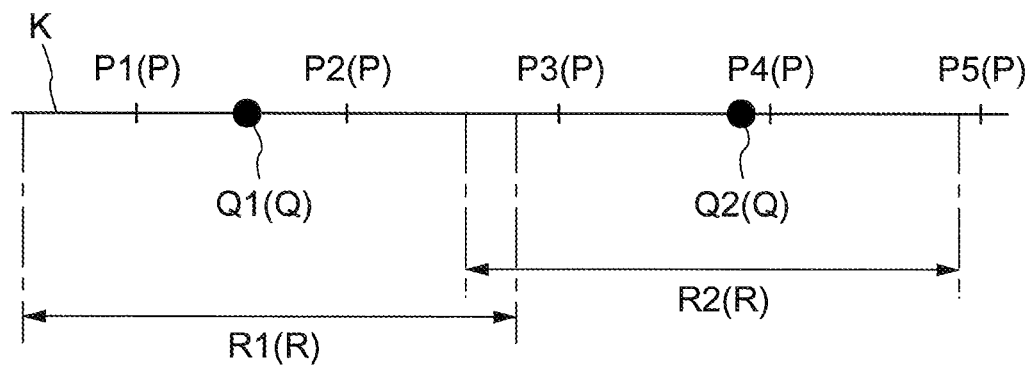
FIG. 6 is an explanatory diagram schematically showing a relationship between an absolute position and an absolute coordinate.

FIG. 6 illustrates a concept for determining the absolute position P on the track K that is indicated in the index 20 and the absolute coordinate Q of the article transport vehicle 3 (camera 73), only for the X axis as a representative. For example, when the image capturing region A is a first image capturing region A1 shown in FIG. 5, a first absolute coordinate Q1 is derived based on a first absolute position P1 and a second absolute position P2 as shown in FIG. 6. When the image capturing region A is a second image capturing region A2 shown in FIG. 5, a second absolute coordinate Q2 is derived based on a third absolute position P3 and a fourth absolute position P4 as shown in FIG. 6. The management apparatus 1 manages the operation by outputting a transport instruction such that the article transport vehicles 3 will not collide with each other on the track K. Each of the article transport vehicles 3 travels while controlling the traveling speed and the acceleration of the own vehicle, based on the front inter-vehicle distance VD with another vehicle preceding the own vehicle. Note that the acceleration includes a negative acceleration during deceleration.

Note that, as another aspect, the index 20 may be an IC tag that utilizes a short-distance wireless communication IC chip. It is preferable that the IC tag as the index 20 is provided, for example, on the traveling rails 2 (at a location that does not come into contact with the wheels 35, such as a side surface of the traveling rails 2). In this case, the sensor for detecting the index 20 is an IC tag reader.

In this manner, the plurality of article transport vehicles 3 are controlled based on the absolute coordinate Q on the track K and the front inter-vehicle distance VD such that the article transport vehicles 3 will not collide with each other. However, in such an article transport facility 100, an operator or an obstacle may enter a location on the track K in the advancing direction of the article transport vehicles 3, thus coming into contact with the article transport vehicles 3. Accordingly, each article transport vehicle 3 is provided with an obstacle sensor 8 as shown in FIG. 4. The obstacle sensor 8 may be, for example, a scanning range sensor, which scans infrared radiation, laser or the like to detect whether or not an object is present in a preset measurement range (a detection area E described below with reference to FIGS. 7 to 9).

Upon detection of the presence of an object (obstacle) in the set detection area E, the obstacle sensor 8 outputs an obstacle detection signal. The transport vehicle control portion 5, which controls the travel of the article transport vehicle 3, controls the traveling driving portion 37 in accordance with the obstacle detection signal so as to reduce the traveling speed of the article transport vehicle 3 or to stop the article transport vehicle 3. For example, the obstacle sensor 8 can set a plurality of detection areas E, and also can output obstacle detection signals separately from each other. The plurality of detection areas E may entirely or partially overlap. If an object is present in an overlapping region, a plurality of obstacle detection signals are valid. If an object is present in a non-overlapping region, an obstacle detection signal corresponding to the detection area E including that region is output.

Figure 7:
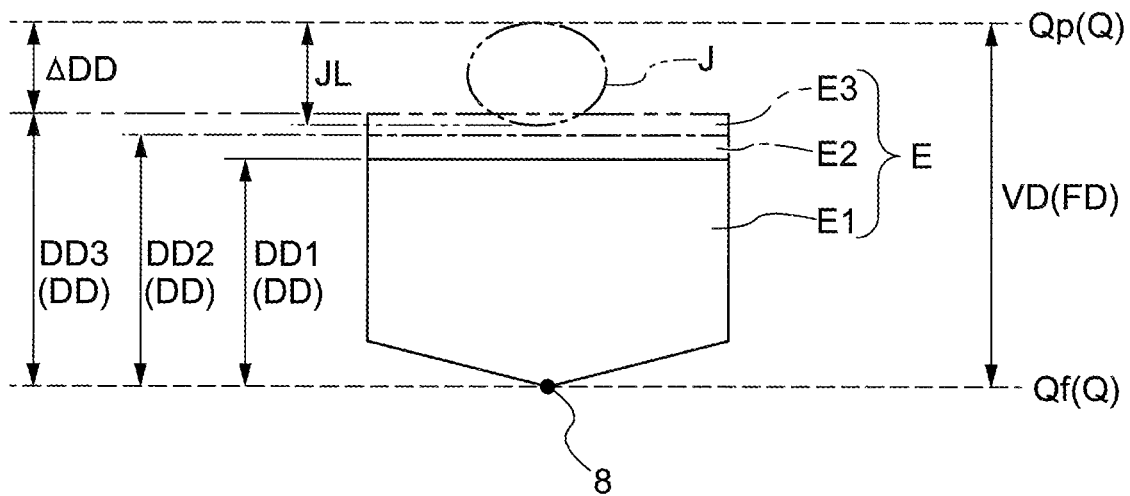
FIG. 7 is an explanatory diagram showing an example of a detection area.
Figure 8:
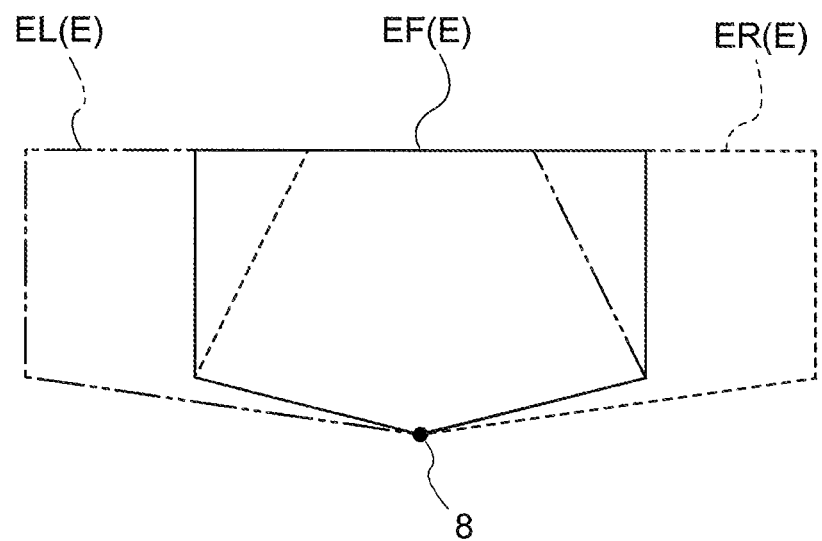
FIG. 8 is an explanatory diagram showing an example of a detection area.
Figure 9:
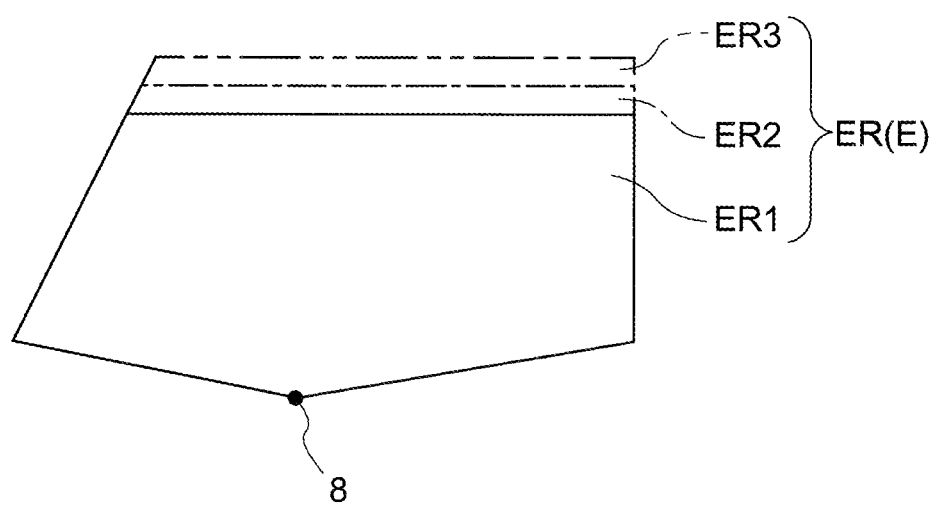
FIG. 9 is an explanatory diagram showing an example of a detection area.

FIGS. 7 to 9 illustrate the detection areas E, showing configurations in each of which three detection areas E can be set. Three detection areas E, namely, E1, E2, and E3 can be set in FIG. 7, three detection areas E, namely, EL, EF, and ER can be set in FIG. 8, and three detection areas E, namely, ER1, ER2, and ER3 can be set in FIG. 9. The details of the detection areas E will be described later. The obstacle sensor 8 is provided on the front surface of the article transport vehicle 3 (on the front side in the advancing direction). When the article transport vehicle 3 travels only in one direction, the obstacle sensor 8 may be provided only on the side of the one direction. When the article transport vehicle 3 travels bidirectionally, it is preferable that the obstacle sensor 8 is provided on the sides of the both directions. In either case, the detection area E is set on the side of the advancing direction of the article transport vehicle 3. That is, the obstacle sensor 8 has a detection area E that includes at least the width of the own vehicle in a width direction S extending along a horizontal plane and orthogonal to the advancing direction of the own vehicle and that expands in the advancing direction (substantially equal to the extension direction T of the traveling rail 2).

Meanwhile, as described previously, each of the article transport vehicles 3 travels while controlling the traveling speed and the acceleration of the own vehicle, based on the front inter-vehicle distance VD with another vehicle preceding the own vehicle. That is, each of the article transport vehicles 3 controls the travel of the own vehicle, based on the front inter-vehicle distance VD corresponding to the own-vehicle position information including the own-vehicle absolute coordinate Qf indicating the position on the track K of the own vehicle and the another-vehicle position information including the another-vehicle absolute coordinate Qp indicating the position on the track K of another vehicle traveling in front of the own vehicle. However, there is the possibility that a preceding article transport vehicle 3 on the track K is detected by the obstacle sensor 8 mounted on the following article transport vehicle 3, thus limiting the travel of the following article transport vehicle 3. In the article transport facility 100, the operation of the article transport vehicles 3 is efficiently controlled according to the position and the inter-vehicle distance of the article transport vehicles 3. However, the occurrence of excessive detection of the obstacle sensor 8 may cause the article transport vehicles 3 to stop, or make it impossible to shorten the inter-vehicle distance, thus reducing the operating efficiency of the facility.

As described previously, the detection area E of the obstacle sensor 8 is variable, rather than being fixed, and thus can be flexibly set. Therefore, the detection area E is set such that the obstacle sensor 8 will not detect the preceding article transport vehicle 3 as an obstacle. That is, the detection area E is set to be variable according to the front inter-vehicle distance VD such that the length of the detection area E along the advancing direction of the obstacle sensor 8 is less than the front inter-vehicle distance VD.

FIG. 7 illustrates the detection areas E that are set when the article transport vehicle 3 travels mainly in the linear section L. Three detection areas E, namely, a first detection area E1, a second detection area E2, and a third detection area E3 are set in ascending order of the distance to a detection target located in front of the own vehicle. The first detection area E1 is a detection area E that includes at least the width of the own vehicle in the width direction S and that expands in the advancing direction over a first distance DD1. The second detection area E2 is a detection area E that includes at least the width of the own vehicle in the width direction S and that expands in the advancing direction over a second distance DD2. The third detection area E3 is a detection area E that includes at least the width of the own vehicle in the width direction S and that expands in the advancing direction over a third distance DD3. As such, each of the detection areas E expands in the advancing direction over the detection distance DD. The detection distance DD, or in other words, the length of the detection area E along the advancing direction of the obstacle sensor 8, is set so as to be less than the front inter-vehicle distance VD. Note that the front inter-vehicle distance VD varies as the traveling speeds of the preceding article transport vehicle 3 and the own vehicle change. Accordingly, the detection distance DD is set to be variable according to the varying front inter-vehicle distance VD. Although the length of the detection area E in the width direction S is longer than the length thereof in the advancing direction in the illustrated example, the length in the advancing direction may, of course, be longer than the length in the width direction S in the case where the front inter-vehicle distance VD is long, for example.

It is preferable that the detection distance DD, and the first detection area E1 to the third detection area E3 based on the detection distance DD are stored in the form of a table in a parameter memory or the like mounted on the article transport vehicle 3. For example, it is preferable that a third detection area E3 is selected such that the third distance DD3 of the third detection area E3 is less than the front inter-vehicle distance VD, and two detection areas E having a detection distance DD shorter than the third distance DD3 are selected in order.

Here, it is preferable that an offset distance ΔDD that is a difference between the longest one of the detection distances DD of the three detection areas E and the front inter-vehicle distance VD is set as follows. For example, when an obstacle such as an operator or another object is present directly behind another vehicle preceding the own vehicle, it is preferable that the obstacle is detected by the obstacle sensor 8 of the own vehicle. However, when the obstacle is present on the other vehicle side at a distance greater than or equal to the third distance DD3 from the own vehicle, the obstacle cannot be detected. Here, when the offset distance ΔDD is less than the length of the obstacle in a direction along the advancing direction of the own vehicle, the obstacle that is present directly behind the preceding another vehicle can be included within the detection area E (at least the third detection area E3). Accordingly, it is preferable that the offset distance ΔDD is set according to the size of an object assumed as a detection target of the obstacle sensor 8.

For example, it is preferable that the detection distance DD, which is the length of the detection area E along the advancing direction, is set such that, when the length, along the advancing direction, of an object that is included in objects J assumed as detection targets of the obstacle sensor 8 and that has the shortest length along the advancing direction is taken as a target object length JL, the offset distance ΔDD is less than the target object length JL. Accordingly, the detection distance DD is set to be less than the front inter-vehicle distance VD and greater than or equal to a distance that is shorter than the front inter-vehicle distance VD by the target object length JL. Note that the objects J assumed as detection targets of the obstacle sensor 8 may be, for example, an operator, another article transport vehicle 3 that is being stopped on the track K owing to a failure or the like, and a fallen object. These objects do not have position information (information corresponding to the front object position information) on the track K.

In the foregoing, a configuration is illustrated in which a plurality of detection areas E each including at least the width of the own vehicle and expanding in the advancing direction are set. However, there may be cases where an obstacle may enter from the lateral side of the track K. Examples include a case where an operator or an object traverses the track K. In this case, it is preferable that approaching of the obstacle from the lateral side is detected before the obstacle reaches on the track K. FIG. 8 illustrates a configuration in which the detection areas E are also set on the lateral sides. In FIG. 8, a configuration is illustrated in which three detection areas E, namely, a left detection area EL, a center detection area EF, and a right detection area ER are set. Note that it is preferable that the center detection area EF is the same as one of the first detection area E1, the second detection area E2, and the third detection area E3 shown in FIG. 7. Although FIG. 8 illustrates the configuration in which the detection distance DD is the same in all of the three detection areas E, namely, the left detection area EL, the center detection area EF, and the right detection area ER, the three detection areas EF may have detection distances DD different from each other.

The transport vehicle control portion 5 can perform control that takes the movements of the obstacle into consideration, including, for example, decelerating the article transport vehicle 3 when an obstacle detection signal corresponding to the left detection area EL is received, and stopping the article transport vehicle 3 when an obstacle detection signal corresponding the center detection area EF is further received. Alternatively, when the article transport vehicle 3 travels in the curved section R of the track K, a detection area E on the inner side may be added to the detection targets, and a detection area E on the outer side may be excluded from the detection targets. In traveling in the curved section R, as shown in FIG. 9, for example, there detection areas E (here, the right detection areas ER are illustrated) corresponding to the inner side may be set so as to have different detection distances DD as in FIG. 7.

Figure 10:
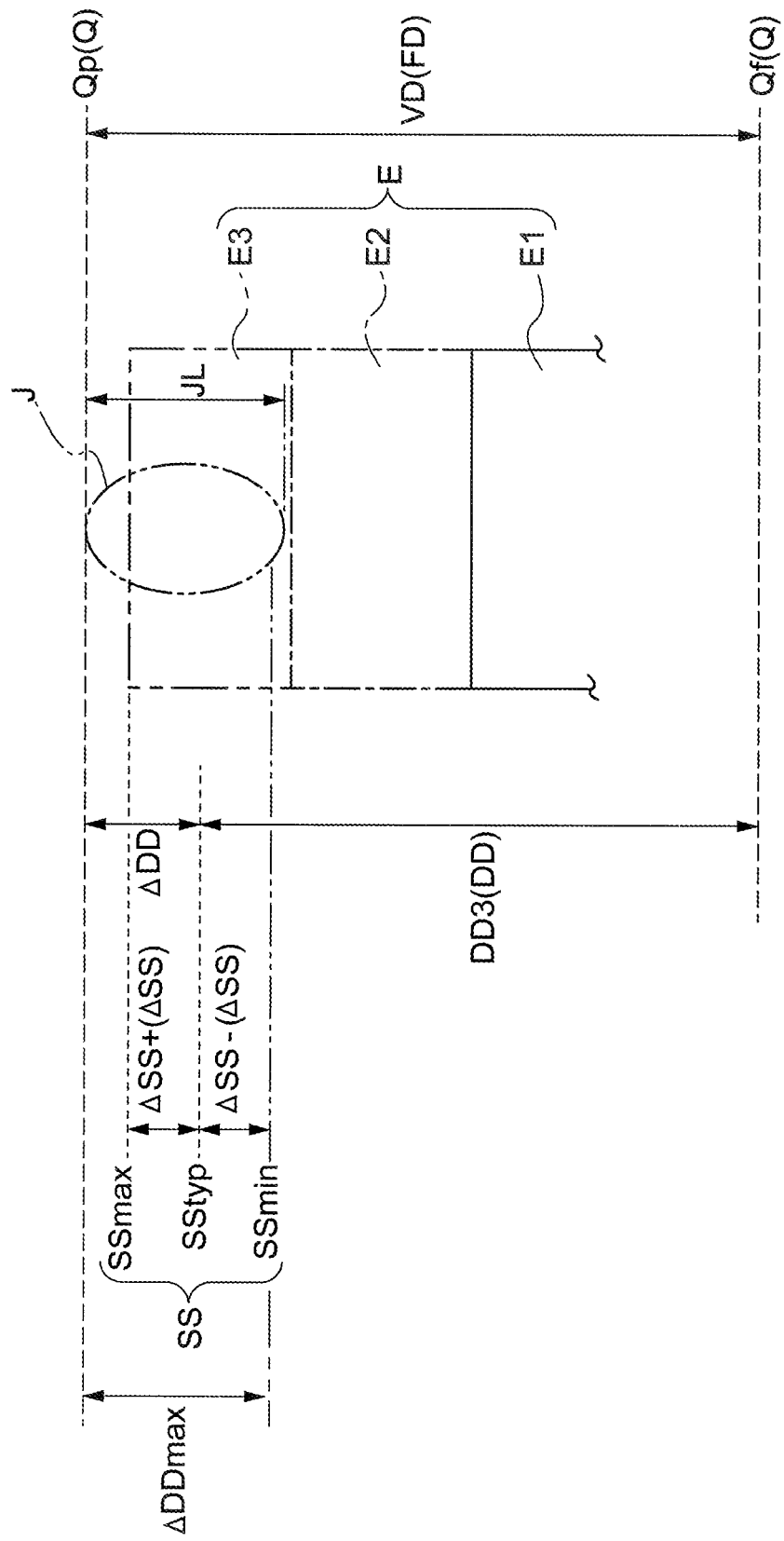
FIG. 10 is an explanatory diagram showing an example of a detection area.

Meanwhile, in general, the obstacle sensors 8 have individual errors in detection accuracy. FIG. 10 illustrates a configuration in which the detection distance DD, which is the length of the detection area E, is set taking into consideration such error in detection accuracy of the obstacle sensor 8. An actual detection distance SS of the obstacle sensor 8 is allowed to have an error within a predetermined reference range (prescribed error ΔSS) for the set detection distance DD. That is, the actual length of the detection area E is allowed to be shorter by a minus side-prescribed error ΔSS− or to be longer by a plus side-prescribed error ΔSS+, relative to the detection distance DD set for each of the obstacle sensors 8. A typical actual detection distance SStyp is the same value as the set detection distance DD, the maximum actual detection distance SSmax is a value obtained by adding a plus side-prescribed error ΔSS+ to the set detection distance DD, and the minimum actual detection distance SSmin is a value obtained by subtracting a minus side-prescribed error ΔSS− from the set detection distance DD. The absolute values of the plus side-prescribed error ΔSS and the minus side-prescribed error ΔSS− may be the same or different. FIG. 10 illustrates a detection area E when the actual length of the detection area E is the maximum actual detection distance SSmax.

When the actual detection distance SS is the maximum actual detection distance SSmax, the obstacle sensor 8 may erroneously detect a front object as an obstacle. Accordingly, the detection distance DD, which is the length of the detection area E along the advancing direction, is set to be a distance shorter than the front inter-object distance FD by at least a prescribed error ΔSS (plus side-prescribed error ΔSS+). Although the prescribed error ΔSS that takes detection accuracy into consideration is illustrated here, control delay of the obstacle sensor 8, delay in transmission form the obstacle sensor 8 to the transport vehicle control portion 5, or the like may also be taking into consideration. That is, the prescribed error ΔSS is an error of the obstacle sensor 8 that is attributed to the properties of the obstacle sensor 8 such as detection accuracy, control delay, transmission delay.

As described previously with reference to FIG. 7, when the detection distance DD, which is the length of the detection area E along the advancing direction, is set such that the offset distance ΔDD is less than the target object length JL, it is preferable that the minus side-prescribed error ΔSS− is taken into consideration. That is, it is preferable that the detection distance DD is set so as to allow the object J to be appropriately detected as an obstacle even when the actual detection distance SS become the shortest, i.e., the minimum actual detection distance SSmin. Specifically, it is preferable that the detection distance DD is set such that the maximum actual offset distance ΔDDmax is less than the target object length JL when the actual detection distance SS is the minimum actual detection distance SSmin. That is, as shown in FIG. 10, the detection distance DD may be set to be less than the front inter-vehicle distance VD and greater than or equal to a distance that is shorter than the front inter-object distance FD by the target object length JL from which the minus side-prescribed error ΔSS− has been subtracted.

As described previously, it is preferable that the offset distance ΔDD, which is the difference between the front inter-object distance FD and the detection distance DD, is set according to the length of the target object, the properties of the obstacle sensor 8, and the target object length JL. When detection delay, control delay, and the like are taken into consideration, the offset distance ΔDD is not limited to a fixed value, and may be a variation value (variable value) corresponding to the state of travel of the article transport vehicle 3, such as the speed and the acceleration. Furthermore, when the offset distance ΔDD is a fixed value, the offset distance ΔDD does not need to be a value strictly corresponding to the length of the target object or the properties of the obstacle sensor 8, and may be a constant value based on an experiment or an experience.

As has been described thus far, according to the present embodiment, in the article transport facility 100 in which the plurality of article transport vehicles 3 travel along the track K so as to transport the article B, it is possible to appropriately detect an obstacle that may possibly come into contact with the plurality of article transport vehicles 3, without hindering the smooth travel of the article transport vehicles 3.

The foregoing illustrates a configuration in which the front object that is located in front of the own vehicle and whose position on the track K is specified is another vehicle traveling in front of the own vehicle, the front object position information indicating the position on the track K of the front object is the another-vehicle position information indicating the position on the track K of another vehicle, the front inter-object distance FD is the front inter-vehicle distance VD corresponding to the own-vehicle position information and the another-vehicle position information, the article transport vehicle 3 controls the travel of the own vehicle, based on the front inter-vehicle distance VD, and sets the length of the detection area E along the advancing direction of the obstacle sensor 8 to be variable according to the front inter-vehicle distance VD such that the length is less than the front inter-vehicle distance VD. However, the front object is not limited to another vehicle, and may be, for example, a blocking device that can be located in front of the own vehicle to block the track K (e.g., an automatic door DR shown in FIG. 11).

As shown in FIG. 11, the article transport facility 100 may include a plurality of spaces (warehouses) 101 and 102 that are each closed by a wall WL. For example, when an article B that is to be stored and transported requires temperature control or humidity control, the first warehouse 101 and the second warehouse 102 are formed as independent spaces that includes a refrigerator or a freezer and whose temperature or humidity is controlled. To control the temperature or the humidity, the first warehouse 101 and the second warehouse 102 are each provided with an automatic door DR, and the track K is laid through the automatic door DR. The automatic door DR is normally closed, and is controlled such that the automatic door DR opens when the article transport vehicle 3 traveling on the track K moves in and out of the first warehouse 101 and the second warehouse 102. As shown in FIG. 4, the automatic door DR (DOOR) is controlled to be opened and closed by the management apparatus 1. The first automatic door DR1 provided in the first warehouse 101 and the second automatic door DR2 provided in the second warehouse 102 are blocking devices that can be located in front of the own vehicle to block the track K, and correspond to the front objects.

That is, the article transport vehicle 3 controls the travel of the own vehicle, based on the front separation distance SD corresponding to the own-vehicle position information and the front object position information indicating the positions on the track K of the first automatic door DR1 and the second automatic door DR2 that can be located in front of the own vehicle to block the track K, and sets the length of the detection area E along the advancing direction of the obstacle sensor 8 to be variable according to the front separation distance SD such that the length is less than the front separation distance SD. The positions on the track K of the first automatic door DR1 and the second automatic door DR2 are fixed positions, and the open/close state of the first automatic door DR1 and the second automatic door DR2 (whether they are blocking the track K) is known by the management apparatus 1. Accordingly, the article transport vehicle 3 can know whether or not the automatic door DR is present on the track K (whether the track K is blocked). When the automatic door DR is closed and the track K is blocked, the article transport vehicle 3 acquires, as the position information of the front object, the position information of the automatic door DR as the front object position information.

Based on the own-vehicle position information and the aforementioned front object position information, the article transport vehicle 3 can calculate the front separation distance SD between the own vehicle and the automatic door DR. For example, as shown in FIG. 11, when the second automatic door DR2 is opened and the first automatic door DR1 is closed, the separation distance between the own vehicle and the first automatic door DR1 is calculated as the front separation distance SD (first front separation distance SD1). When the second automatic door DR2 is closed, the separation distance between the own vehicle and the second automatic door DR2 is calculated as the front separation distance SD (second front separation distance SD2), regardless of the open/close stated of the first automatic door DR1. The front separation distance SD corresponds to the front inter-object distance between the own vehicle and the front object.

Thus, the front object may include not only another vehicle traveling in front of the own vehicle, but also the automatic door DR as a blocking device that can be located in front of the own vehicle to block the track K. That is, the article transport vehicle 3 controls the travel of the own vehicle, based on the front inter-object distance FD (including the front separation distance SD and the front inter-vehicle distance VD as described above) corresponding to the own-vehicle position information and the front object position information indicating the position on the track K of an object including at least a blocking device that can be located in front of the own vehicle to block the track K, and another vehicle traveling in front of the own vehicle, and sets the length of the detection area E along the advancing direction of the obstacle sensor 8 to be variable according to the front inter-object distance FD such that the length is less than the front inter-object distance FD.

Outline of the Embodiment

The following is a brief description of an outline of the article transport vehicle described above.

According to an aspect, an article transport vehicle for use in an article transport facility in which a plurality of article transport vehicles travel along a track so as to transport articles, includes an obstacle sensor having a detection area that includes at least a width of own vehicle in a width direction extending along a horizontal plane and orthogonal to an advancing direction of the own vehicle and that expands in the advancing direction. The article transport vehicle controls travel of the own vehicle, based on a front inter-object distance corresponding to own-vehicle position information indicating a position on the track of the own vehicle and front object position information indicating a position on the track of a front object that is located in front of the own vehicle and whose position on the track is specified, and sets a length of the detection area along the advancing direction of the obstacle sensor to be variable according to the front inter-object distance such that the length is less than the front inter-object distance.

With this configuration, the obstacle sensor has a detection area that includes at least the width of the article transport vehicle and that expands in the advancing direction. Accordingly, it is possible to appropriately detect an obstacle that is present in the advancing direction of the article transport vehicle and that may possibly come into contact with the article transport vehicle when the article transport vehicle advances. Since the detection area is set to be less than the front inter-object distance, it is possible to reduce the possibility of erroneously detecting, as an obstacle, a front object whose position on the track is specified, such as a blocking device blocking the track in front of the own vehicle and another vehicle traveling in front of the own vehicle. In the case where the own vehicle is traveling, even when the position on the track of the front object is specified such as in the case of the blocking device, the front inter-object distance with the blocking device naturally varies. Since the state of travel (traveling or stopped) and the traveling speeds of each of the vehicles, including the own vehicle and another vehicle are not always the same, the front inter-object distance with the other vehicle also varies. The detection area is set to be variable according to the front inter-object distance. Accordingly, even when the front inter-object distance varies, the detection area follows the variation so as to be less than the front inter-object distance. Therefore, it is possible to reduce the possibility of erroneously detecting, as an obstacle, a front object, including, for example, a blocking device blocking the track in front of the own vehicle and another vehicle traveling in front of the own vehicle. Thus, the present configuration makes it possible to appropriately detect an obstacle that may possibly come into contact with a plurality of article transport vehicles, without hindering the smooth travel of the article transport vehicles.

Here, it is preferable that the front object is another vehicle traveling in front of the own vehicle, the front object position information is another-vehicle position information indicating a position on the track of the other vehicle, and the front inter-object distance is a front inter-vehicle distance corresponding to the own-vehicle position information and the another-vehicle position information. The article transport vehicle controls the travel of the own vehicle, based on the front inter-vehicle distance, and sets the length of the detection area along the advancing direction of the obstacle sensor to be variable according to the front inter-vehicle distance such that the length is less than the front inter-vehicle distance.

As described previously, the obstacle sensor has a detection area that includes at least the width of the article transport vehicle and that expands in the advancing direction. Accordingly, it is possible to appropriately detect an obstacle that is present in the advancing direction of the article transport vehicle and that may possibly come into contact with the article transport vehicle when the article transport vehicle advances. Since the detection area is set to be less than the front inter-vehicle distance, it is possible to reduce the possibility of erroneously detecting another vehicle traveling in front of the own vehicle as an obstacle. Since the state of travel (traveling or stopped) and the traveling speed of each of the vehicles are not always the same, the front inter-vehicle distance also varies. The detection area is set to be variable according to the front inter-vehicle distance. Therefore, even when the front inter-vehicle distance varies, the detection area follows the variation so as to be less than the front inter-vehicle distance. According, in such a case as well, it is possible to reduce the possibility of erroneously detecting another vehicle traveling in front of the own vehicle as an obstacle. That is, it is possible to appropriately detect an obstacle that may possibly come into contact with a plurality of article transport vehicles, without hindering the smooth travel of the article transport vehicles.

Here, it is preferable that the own vehicle acquires the another-vehicle position information from the other vehicle by communicating with the other vehicle, and calculates the front inter-vehicle distance.

An article transport facility may include a facility management apparatus that manages and controls the entire article transport facility. In such a case, the facility management apparatus often has position information indicating the positions on the track of a plurality of article transport vehicles. Such position information can be provided, for example, from each of the article transport vehicles to the facility management apparatus. The facility control apparatus can calculate a front inter-vehicle distance of each of the article transport vehicles, and provides the front inter-vehicle distance to each of the article transport vehicles. When each of the article transport vehicles acquires the front inter-vehicle distance by using such a procedure, the time for calculating a plurality of front inter-vehicle distances and the communication time are required. However, when each of the article transport vehicle (own vehicle) acquires the another-vehicle position information from another article transport vehicle (another vehicle), and calculates the front inter-vehicle distance of the article transport vehicle (own vehicle), it is sufficient to perform calculation for a single front inter-vehicle distance, thus reducing the calculation load, and also eliminating the need for the communication time for transmitting the calculation result. As a result, the front inter-vehicle distance can be promptly updated to the latest information, making it possible to variably set the detection area in an appropriate manner.

It is preferable that, when a length, along the advancing direction, of an object that is included in objects assumed as detection targets of the obstacle sensor and that has the shortest length along the advancing direction is taken as a target object length, a length of the detection area along the advancing direction is set to be less than the front inter-object distance and greater than or equal to a distance that is shorter than the front inter-object distance by the target object length.

With this configuration, even when a detection target that can be an obstacle is present at a position in the vicinity of a blocking device blocking the track in front of the own vehicle or another vehicle preceding the own vehicle, the detection area can be set such that the detection target can be appropriately detected.

It is preferable that an actual length of the detection area along the advancing direction is allowed to be shorter or longer by a predefined prescribed error, relative to a length set for the obstacle sensor, and the length of the detection area along the advancing direction is set to a distance shorter than the front inter-object distance by at least the prescribed error.

In general, obstacle sensors have individual errors in detection accuracy. For this reason, the detection area of an obstacle sensor is often allowed to have an error within a predetermined reference range. For example, the actual length of the detection area is allowed to be shorter by the above-described prescribed error or to be longer by the prescribed error, relative to the length of the detection area set for each of the obstacle sensors. Here, when the detection area is longer by a prescribed distance, a front object may be erroneously detected as an obstacle. The occurrence of such erroneous detection can be suppressed when the length of the detection area set for each of the obstacle sensors is set to be a distance shorter than the front inter-object distance by at least the prescribed error.

It is preferable that an actual length of the detection area along the advancing direction is allowed to be shorter by a predefined minus side-prescribed error or longer by a plus side-prescribed error, relative to a length set for the obstacle sensor, and a length of the detection area along the advancing direction is set to a distance shorter than the front inter-object distance by at least the plus side-prescribed error, and, when the length, along the advancing direction, of an object that is included in objects assumed as detection targets of the obstacle sensor and that has shortest length along the advancing direction is taken as a target object length, the actual length of the detection area along the advancing direction is set to be greater than or equal to a distance shorter than the front inter-object distance by the target object length from which the minus side-prescribed error has been subtracted.

As described previously, in general, obstacle sensors have individual errors in detection accuracy. For this reason, the actual length of the detection area is allowed to be shorter by the minus side-prescribed error or to be longer by the plus side-prescribed error, relative to the length of the detection area set for each of the obstacle sensors. It is possible to suppress the possibility of erroneously detecting a front object as an obstacle when the length of the detection area set for the obstacle sensor is set to be a distance shorter than the front inter-object distance by the plus side-prescribed error. As described previously, when a detection target that can be an obstacle is present at a position the vicinity of a blocking device blocking the track in front of the own vehicle or another vehicle preceding the own vehicle, it is preferable that the length of the detection area is set to be greater than or equal to a distance shorter than the front inter-object distance by the target object length such that such an obstacle is appropriately detected. When the length of the detection area is shorter by the minus side-prescribed error, it is most difficult for the obstacle to be detected. Therefore, in order to appropriately detect the obstacle even in that case, it is preferable that the length of the detection area is set to be greater than or equal to a distance that is shorter than the front inter-object distance by the target object length from which the minus side-prescribed error has been subtracted.

What is claimed is:

1. An article transport vehicle for use in an article transport facility in which a plurality of article transport vehicles travel along a track so as to transport articles, the article transport vehicle comprising:
an obstacle sensor having a detection area that includes at least a width of own vehicle in a width direction extending along a horizontal plane and orthogonal to an advancing direction of the own vehicle and that expands in the advancing direction,
wherein the article transport vehicle controls travel of the own vehicle, based on a front inter-object distance corresponding to own-vehicle position information indicating a position on the track of the own vehicle and front object position information indicating a position on the track of a front object that is located in front of the own vehicle and whose position on the track is specified, and sets a length of the detection area along the advancing direction of the obstacle sensor to be variable according to the front inter-object distance such that the length is less than the front inter-object distance.

2. The article transport vehicle according to claim 1, wherein the front object is another vehicle traveling in front of the own vehicle, the front object position information is another-vehicle position information indicating a position on the track of the other vehicle, and the front inter-object distance is a front inter-vehicle distance corresponding to the own-vehicle position information and the another-vehicle position information.

3. The article transport vehicle according to claim 2, wherein the own vehicle acquires the another-vehicle position information from the other vehicle by communicating with the other vehicle, and calculates the front inter-vehicle distance.

4. The article transport vehicle according to claim 1, wherein when a length, along the advancing direction, of an object that is included in objects assumed as detection targets of the obstacle sensor and that has the shortest length along the advancing direction is taken as a target object length, a length of the detection area along the advancing direction is set to be less than the front inter-object distance and greater than or equal to a distance that is shorter than the front inter-object distance by the target object length.

5. The article transport vehicle according to claim 2, wherein when a length, along the advancing direction, of an object that is included in objects assumed as detection targets of the obstacle sensor and that has the shortest length along the advancing direction is taken as a target object length, a length of the detection area along the advancing direction is set to be less than the front inter-object distance and greater than or equal to a distance that is shorter than the front inter-object distance by the target object length.

6. The article transport vehicle according to claim 3, wherein when a length, along the advancing direction, of an object that is included in objects assumed as detection targets of the obstacle sensor and that has the shortest length along the advancing direction is taken as a target object length, a length of the detection area along the advancing direction is set to be less than the front inter-object distance and greater than or equal to a distance that is shorter than the front inter-object distance by the target object length.

7. The article transport vehicle according to claim 1, wherein an actual length of the detection area along the advancing direction is allowed to be shorter or longer by a predefined prescribed error, relative to a length set for the obstacle sensor, and wherein the length of the detection area along the advancing direction is set to a distance shorter than the front inter-object distance by at least the prescribed error.

8. The article transport vehicle according to claim 2, wherein an actual length of the detection area along the advancing direction is allowed to be shorter or longer by a predefined prescribed error, relative to a length set for the obstacle sensor, and wherein the length of the detection area along the advancing direction is set to a distance shorter than the front inter-object distance by at least the prescribed error.

9. The article transport vehicle according to claim 3, wherein an actual length of the detection area along the advancing direction is allowed to be shorter or longer by a predefined prescribed error, relative to a length set for the obstacle sensor, and wherein the length of the detection area along the advancing direction is set to a distance shorter than the front inter-object distance by at least the prescribed error.

10. The article transport vehicle according to claim 4, wherein an actual length of the detection area along the advancing direction is allowed to be shorter or longer by a predefined prescribed error, relative to a length set for the obstacle sensor, and wherein the length of the detection area along the advancing direction is set to a distance shorter than the front inter-object distance by at least the prescribed error.

11. The article transport vehicle according to claim 5, wherein an actual length of the detection area along the advancing direction is allowed to be shorter or longer by a predefined prescribed error, relative to a length set for the obstacle sensor, and wherein the length of the detection area along the advancing direction is set to a distance shorter than the front inter-object distance by at least the prescribed error.

12. The article transport vehicle according to claim 6, wherein an actual length of the detection area along the advancing direction is allowed to be shorter or longer by a predefined prescribed error, relative to a length set for the obstacle sensor, and wherein the length of the detection area along the advancing direction is set to a distance shorter than the front inter-object distance by at least the prescribed error.

13. The article transport vehicle according to claim 4, wherein an actual length of the detection area along the advancing direction is allowed to be shorter by a predefined minus side-prescribed error or longer by a plus side-prescribed error, relative to a length set for the obstacle sensor, and wherein a length of the detection area along the advancing direction is set to a distance shorter than the front inter-object distance by at least the plus side-prescribed error, and is also set to be greater than or equal to a distance shorter than the front inter-object distance by the target object length from which the minus side-prescribed error has been subtracted.

14. The article transport vehicle according to claim 5, wherein an actual length of the detection area along the advancing direction is allowed to be shorter by a predefined minus side-prescribed error or longer by a plus side-prescribed error, relative to a length set for the obstacle sensor, and wherein a length of the detection area along the advancing direction is set to a distance shorter than the front inter-object distance by at least the plus side-prescribed error, and is also set to be greater than or equal to a distance shorter than the front inter-object distance by the target object length from which the minus side-prescribed error has been subtracted.

15. The article transport vehicle according to claim 6, wherein an actual length of the detection area along the advancing direction is allowed to be shorter by a predefined minus side-prescribed error or longer by a plus side-prescribed error, relative to a length set for the obstacle sensor, and wherein a length of the detection area along the advancing direction is set to a distance shorter than the front inter-object distance by at least the plus side-prescribed error, and is also set to be greater than or equal to a distance shorter than the front inter-object distance by the target object length from which the minus side-prescribed error has been subtracted.

* * * * *